United States Patent
Hikmet et al.

(10) Patent No.: US 6,171,518 B1
(45) Date of Patent: Jan. 9, 2001

(54) METHOD OF PREPARING A CROSS-LINKED MACROSCOPICALLY ORIENTED POLYMER

(75) Inventors: Rifat A. M. Hikmet; Johan Lub, both of Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/064,209

(22) Filed: Apr. 22, 1998

(30) Foreign Application Priority Data

Apr. 29, 1997 (EP) .................................................. 97201301

(51) Int. Cl.$^7$ ............................ C09K 19/52; C09K 19/12
(52) U.S. Cl. ............................. 252/299.01; 252/299.65; 252/299.66; 252/299.67
(58) Field of Search ..................... 252/299.01, 299.65, 252/299.66, 299.67

(56) References Cited

U.S. PATENT DOCUMENTS

| | | | |
|---|---|---|---|
| 5,042,925 | 8/1991 | Broer et al. | 359/37 |
| 5,188,760 | * 2/1993 | Hikmet et al. | 252/299.01 |
| 5,354,498 | * 10/1994 | Akashi et al. | 252/299.01 |
| 5,498,450 | * 3/1996 | Akashi et al. | 428/1 |
| 5,518,652 | * 5/1996 | Parri et al. | 252/299.01 |
| 5,558,813 | * 9/1996 | Akashi et al. | 252/299.01 |
| 5,593,615 | * 1/1997 | Nerad et al. | 252/299.01 |
| 5,593,617 | * 1/1997 | Kelly et al. | 252/299.67 |
| 5,707,543 | * 1/1998 | Akashi et al. | 252/299.01 |
| 5,750,051 | * 5/1998 | Goulding et al. | 252/299.65 |
| 5,833,880 | * 11/1998 | Simensmeyer et al. | 252/299.64 |
| 5,846,451 | * 12/1998 | Nakano et al. | 252/299.01 |
| 5,851,424 | * 12/1998 | Kelly | 252/299.61 |
| 5,863,457 | * 1/1999 | Hasebe et al. | 252/299.01 |

FOREIGN PATENT DOCUMENTS

WO9524454   9/1995 (WO) .............................. C09K/9/38

OTHER PUBLICATIONS

"Anisotropic Networks and Gels Obtained by Photopolymerisation in the Liquid Crystalline State: Synthesis and Applications", by R.A.M. Hikmet and J. Lub in Prog. Polym. Sci., vol. 21, 1996, p. 1165–1209.

"In–situ Polymer Networks from a Mesogenic Diacrylate", by Broer et al. in Makromol. Chem., 1989, 190, p.2255–2268.

* cited by examiner

Primary Examiner—C. H. Kelly
(74) Attorney, Agent, or Firm—Ernestine C. Bartlett

(57) ABSTRACT

The invention relates to a method of preparing an oriented cross-linked polymer, which comprises the steps of orienting and polymerizing a liquid-crystal composition. The liquid-crystal composition comprises a monomer which reduces the order during polymerization. This makes it possible to obtain oriented cross-linked polymers having a low degree of optical anisotropy and optical elements having a relatively low degree of scattering.

14 Claims, 1 Drawing Sheet

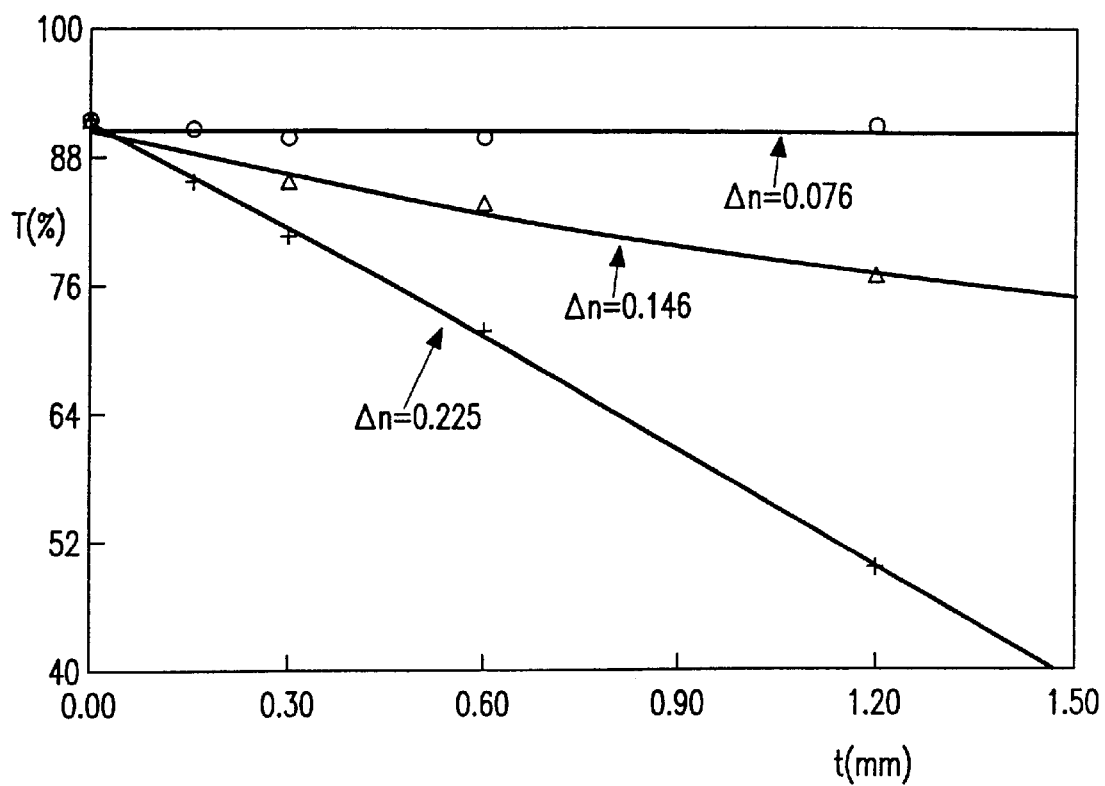

METHOD OF PREPARING A CROSS-LINKED MACROSCOPICALLY ORIENTED POLYMER

BACKGROUND OF THE INVENTION

The invention relates to a method of preparing an oriented cross-linked polymer, wherein a polymerizable liquid crystal composition, comprising at least a liquid crystal monomer, is oriented and subsequently polymerized. The invention also relates to liquid crystal compositions suitable for use in such a method and to cross-linked polymers obtainable by using such a method. The invention further relates to optical elements comprising cross-linked polymers obtainable by using such a method.

Oriented cross-linked polymers are useful materials, inter alia, for lighting and display applications, because they are optically anisotropic. Optically anisotropic materials can be used to manipulate the characteristics of light beams, such as polarizable, direction, intensity, color and splitting. Optical elements which can be made thereof are, for example, (polarizing) beam splitters, retardation plates, (reflective) polarizers and compensation foils.

A method of the type mentioned in the opening paragraph is described in U.S. Pat. No. Specification 5,042,925. In the known method, a uniaxially oriented liquid-crystal diacrylate monomer is photopolymerized using a photoinitiator and UV radiation so as to obtain a layer of a uniaxially oriented polymeric network or, in other words, a cross-linked polymer. The polymer is optically anisotropic, its birefringence being approximately 0.12.

A disadvantage of said known method is that it has limited means to adjust the optical properties, such as the (extra) ordinary refractive index or the birefringence, to desired values. Adjustment of the birefringence is achieved by adjustment of the temperature at which the polymerization is performed. In this way, only a small range of birefringence values is reliably accessible. In particular, low degrees of optical anisotropy are difficult to obtain since this requires polymerizing at a temperature close to the clearing temperature (that is the temperature at which the transition between the liquid crystalline and isotropic phases occurs) of the liquid-crystal composition. At such critical temperatures, the optical properties are rather sensitive to small changes in temperature, the orientation is easily lost and undesirable biphasic structures easily develop.

OBJECTS AND SUMMARY OF THE INVENTION

It is an object of the invention, inter alia, to provide a method of preparing an oriented cross-linked polymer which does not have the above-mentioned disadvantages. In particular, it is an object of the invention to provide a method of the type mentioned in the opening paragraph which has novel means for adjusting the degree of optical anisotropy to a desired value. The method should allow the degree of optical anisotropy to be adjustable over a wide range. Further, it should allow low degrees of optical anisotropy to be attained in a simple and reliable manner.

This object is achieved by a method of the type mentioned in the opening paragraph which, according to the invention, is characterized in that the polymerizable liquid-crystal composition further comprises an order-reducing monomer, which reduces the order of said liquid-crystal composition during polymerization.

The order-reducing monomer represents a novel means for adjusting the degree of optical anisotropy. Using said monomer in the method according to the invention allows the degree of optical anisotropy to be adjusted over a wide range. By simply varying the nature of the order-reducing monomer and/or the concentration in which it is used, the degree of optical anisotropy can be accurately and reliably adjusted. In particular, low degrees of optical anisotropy can be attained. In a typical example, the birefringence of a uniaxially oriented cross-linked polymer could be varied from 0.101 to a value as low as 0.009 by varying the liquid-crystal monomer to order-reducing monomer ratio from 3:1 to 1:3.

In addition, the temperature of polymerization can be used to adjust the degree of optical anisotropy.

The purpose of the order-reducing monomer is to reduce the order of the liquid-crystal composition during polymerisation and, consequently, the optical anisotropy. As a result, a cross-linked polymer is obtained which has a degree of optical anisotropy which is significantly lower than the degree of optical anisotropy of the liquid-crystal composition from which it is obtained. The presence of the order-reducing monomer may also lower the degree of optical anisotropy of the liquid-crystal composition before polymerization, but the invention does not relate to this side-effect per se. Preferably use is made of an order-reducing monomer having intrinsically a high degree of optical anisotropy so as to obtain a polymerizable liquid-crystal composition with a high degree of optical anisotropy. In this case, it has surprisingly been found that the degree of optical anisotropy of the polymer which is obtained after polymerization is lower than the degree of optical anisotropy which can be obtained with oriented samples made from each of the monomers separately, both before and after polymerization with the proviso that the order-reducing monomer itself exhibits liquid-crystalline behaviour.

The presence of the order-reducing monomer neither precludes the liquid crystal composition from being oriented, nor leads to a substantial change of the clearing temperature of the liquid crystal composition, if it is used in moderate amounts.

The method according to the invention can be used to obtain any type of oriented cross-linked polymer, such as a uniaxially, biaxially, or helicoidally oriented polymer. The orientation can also be tilted.

In the context of the invention, an oriented polymer is considered to be a polymer whose type of orientation is the same throughout a certain volume, and whose size is selected so as to achieve a specific technical effect. If throughout an oriented sample the type of orientation is the same, it does not mean that the (optical) properties may not vary from position to position. For example, the pitch of a helicoidally oriented polymer may vary across the sample. In another example, local variations in the properties of an oriented polymer can be attained by photoinitiating the polymerization by patternwise irradiation.

The polymerizable liquid-crystal composition is conveniently oriented using conventional means such as exposure to an electric field or magnetic field or, preferably, by bringing the composition into contact with an orientation-inducing surface of a substrate. Such a surface can be provided with an orientation-inducing layer such as an obliquely sputtered silicon-dioxide layer or, preferably, a polyimide layer rubbed with a velvet cloth.

In contrast to inorganic optically anisotropic materials, such as quartz and calcite, the cross-linked polymers can be easily given any desired shape using simple replication techniques.

The polymerization is conveniently initiated by adding to the polymerizable liquid-crystal composition a small amount, generally less than 2 wt %, of an initiator which is activated thermally. Preferably, an initiator which can be activated by means of actinic radiation such as, in particular, (near) UV radiation, i.e. a photoinitiator, is used. One of the resultant advantages is that polymerization may be performed according to a desired pattern by a patternwise exposure using for example a mask. Optical elements such as gratings can be easily obtained in this manner without the use of photolithography with a photoresist.

The polymerization product is a cross-linked polymer. The polymerizable liquid-crystal composition should therefore be cross-linkable, that is, it should contain a cross-linking agent. If acrylate, vinyl ether or epoxide monomers are polymerized, diacrylates, divinylethers, diepoxides or monomers having even more than two groups serve as cross-linking agents. The cross-linking agent may be added as an additional component or, alternatively, the liquid crystal monomer and/or the order-reducing monomer may serve as a cross-linking agent. In the latter case, mesogenic groups are present between the cross-links of the cross-linked polymer. As a result, at least the orientation of these mesogenic groups is permanently fixed and less sensitive to variations in temperature. A cross-linked polymer is considered to be equivalent to a three-dimensional polymeric network, said network extending in three independent directions.

Polymerizable liquid-crystal compositions which can be suitably used in the method according to the invention comprise at least a liquid-crystal monomer and an order-reducing monomer.

In the context of the invention, a liquid-crystal monomer is a monomer having at least one polymerizable group exhibiting at least one liquid-crystalline phase having a certain degree of order which can be more or less fixed by polymerization in a manner such that during polymerization the degree of order is substantially unchanged. By contrast, if an order-reducing monomer is polymerized by itself, the degree of order is substantially lost. Therefore, in the context of the invention, the group of liquid-crystal monomers and the group of order-reducing monomers are disjunct.

Suitable examples of liquid-crystal monomers include monomers which satisfy the formula Y—$X^1$—$L^1$—M—$L^2$—$X^2$—Y, where
Y is a polymerizable group selected from the group consisting of acryloxy, i.e. $CH_2$=CH—COO—, methacryloxy, i.e. $CH_2$=C($CH_3$)—COO—, vinyloxy, i.e. $CH_2$=CH—O—, and epoxy,
—$X^1$— and —$X^2$— are spacer units which are independently selected and which represent a $C_1$-$C_{12}$ alkylene, which may or may not be interrupted by one or more —O—, —S— or —NH— units,
—$L^1$— and —$L^2$— are linker units independently selected from the group consisting of —O—, —OCO—, —COO— and —$CH_2$—,
—M— is a mesogenic unit selected from the group consisting of —$M^1$—$M^2$—, —$M^1$—$M^3$—$M^2$—, —$M^1$—COO—$M^2$—, —$M^1$—COO—$M^3$—OCO—$M^2$—, —$M^1$—COO—$M^3$—COO—$M^2$— and —$M^1$—OCO—$M^3$—COO—$M^2$—, —$M^1$— and —$M^2$— are independently selected and represent a 1,4-phenylene or a 1,4-cyclohexylene,
—$M^3$— represents

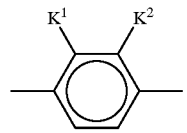

and —$K^1$ and —$K^2$ are independently selected from the group consisting of —H, —$CH_3$, —CN and —Cl. These monomers can be synthesized by methods described, for example, in a publication by Hikmet et al. in Prog. Polym. Sci. 1996, 21, 1165. Further examples of suitable liquid crystal monomers are given in the International Patent Application WO 95/24454.

A particularly high degree of optical transparency is obtained using monomers wherein the polymerisable group Y is acryloxy or methacryloxy. Such monomers are therefore preferred.

The linker units —$L^1$— and —$L^2$— are preferably equal and in particular equal to —O—.

The spacer units —$X^1$— and —$X^2$— are preferably selected so as to represent —$(CH_2)_p$—, —$CH_2$—CH($CH_3$)—$(CH_2)_{p-2}$— or —$CH_2$—$CH_2$—CH($CH_3$)—$(CH_2)_{p-3}$—, where p is selected to range from 1 to 11.

The mesogenic unit —M— is preferably —$M^1$—COO—$M^3$—OCO—$M^2$—, with —$M^1$, —$M^2$— and —$M^3$— equal to a 1,4-phenylene.

Particularly favorable optical properties are obtained using diacrylates according to the formulae listed below. Especially preferred are diacrylates according to formulae 1–4.

Also suitable are liquid-crystal monomers having one polymerizable group which satisfy the formula Y—$X^1$—$L^1$—M—P in which Y, $X^1$, $L^1$ and M have the above meaning and P is selected from the group consisting of cyano, alkyl and alkoxy. Preferred alkyl groups are $C_1$-$C_{12}$, particularly, $C_5$-$C_{11}$, such as hexyl. Preferred alkoxy groups are $OC_1$-$OC_{12}$, particularly, $OC_5$-$OC_{11}$, such as hexyloxy. These monomers can be synthesized using methods similar to those described by Hikmet et al. in Prog. Polym. Sci. 1996, 21, 1165.

In the method according to the invention, use is made of an order-reducing monomer. Suitable order-reducing monomers have at least one polymerizable group and a molecular shape which is similar to that of the liquid-crystal monomer which is part of the composition yet is stiffer and less flexible. The order-reducing monomer is chosen to be such that it either has a liquid-crystalline phase or can be added, if need be even in large quantities, to a liquid-crystal composition without the composition losing its ability to exhibit liquid-crystalline behaviour. In general, if polymerized by itself, the order-reducing monomer will not produce an oriented polymer.

Examples of non-liquid crystalline, yet order-reducing monomers are hexanedioldiacrylate and the monomer 4,4'-bisacryloxybiphenyl.

Suitable examples of order-reducing monomers having two polymerisable groups are given in the method wherein the order-reducing monomer satisfies the formula Y—$L^3$—M—$L^4$—Y, where Y is a polymerizable group selected from the group consisting of acryloxy, methacryloxy, vinyloxy and epoxy,
—$L^3$— and —$L^4$— are linker units which are independently selected and represent a direct bond or —$CH_2$—, —M— is a mesogenic unit selected from the group consisting of —M¹—M²—, —M¹—M³—M²—, —M¹—COO—M²—, —M¹—COO—M³—OCO—M²—, —M¹—COO—M³—COO—M²— and —M¹—OCO—M³—COO—M²—, —M¹— and —M²— are independently selected and represent a 1,4-phenylene or a 1,4-cyclohexylene,
—M³— represents

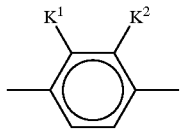

1 and —K¹ and —K² are independently selected from the group consisting of —H, —CH₃, —CN and —Cl.

Suitable examples of order-reducing monomers having one polymerisable group are given in the method wherein the order-reducing monomer satisfies the formula Y—L³—M—P, where Y is a polymerizable group selected from the group consisting of acryloxy, methacryloxy, vinyloxy and epoxy, —L³— is a linker unit which is independently selected and represents a direct bond or —CH₂—, —M— is a mesogenic unit selected from the group consisting of —M¹—M²—, —M¹—M³—M²—, —M¹—COO—M²—, —M¹—COO—M³—OCO—M²—, —M¹—COO—M³—COO—M²— and —M¹—OCO—M³—COO—M²—, —M¹— and —M²— are independently selected and represent a 1,4-phenylene or a 1,4-cyclohexylene, —M³— represents

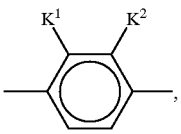

2 wherein —K¹ and —K² are independently selected from the group consisting of —H, —CH₃, —CN and —Cl and P is selected from the group consisting of cyano, alkyl and alkoxy. Preferred alkyl groups are $C_1$–$C_{12}$, particularly, $C_5$–$C_{11}$, such as hexyl. Preferred alkoxy groups are $OC_1$–$OC_{12}$, particularly, $OC_5$–$OC_{11}$, such as hexyloxy.

Preferred order-reducing monomers are those wherein the order-reducing monomer satisfies one of the formulae 5–8 above.

The order-reducing monomer which is used in a method of the invention can be synthesized by methods similar to those described, for example, in a publication by Hikmet et al. in Prog. Polym. Sci. 1996, 21, 1165.

Highly transparent oriented cross-linked polymers are obtained using monomers wherein the polymerizable group Y is acryloxy or methacryloxy.

The invention also relates to a polymerizable liquid-crystal composition comprising at least a liquid-crystal monomer. In accordance with the invention, said composition is characterized in that the polymerisable liquid-crystal composition further comprises an order-reducing monomer, which reduces the order of said liquid-crystal composition during polymerization. Examples of suitable liquid-crystal monomers and order-reducing monomers, which are both part of the polymerizable liquid-crystal composition, have already been provided hereinabove.

The invention further relates to an oriented cross-linked polymer obtained by polymerizing a polymerizable liquid crystal composition. In accordance with the invention, the cross-linked polymer is characterized in that said oriented cross-linked polymer is obtainable by using a method according to the invention and in that the difference between the highest and lowest refractive index of the oriented cross-linked polymer is less than 0.10.

Oriented cross-linked polymers obtained by polymerizing a polymerizable liquid-crystal composition can be conveniently given any shape using simple replication techniques so as to obtain optical elements of a particular shape such as a film, a wedge or a prism. If such elements are to be manufactured in mass-production, it is important that the element is easy to handle and can be made in a reproducible manner with a small variation in properties. These requirements are best met if the optical element has a certain minimum size. For example, in the case of a film, a convenient thickness would be of the order of 1 mm. However, the inventor has observed that if such a thick film is made using a liquid-crystal composition, which may or may not be polymerizable, light transmitted by it is often highly scattered. In the case of optical elements which require a high yield of transmitted light, such as Wollaston prisms, retardation plates and compensation foils, scattering of the transmitted light is undesirable.

In order to at least reduce this undesirable scattering of transmitted light the invention provides an oriented cross-linked polymer obtainable by using a method according to the invention which is further characterized in that the difference between the highest and lowest refractive index of the oriented cross-linked polymer is less than 0.10. Preferably, the difference is less than 0.08. Since the oriented cross-linked polymer is optically anisotropic, a difference larger than 0.0, for example, 0.001, is implied.

It is to be noted that the refractive index is a second order tensor of rank 3. In diagonal form it has three components, viz. $n_1$, $n_2$ and $n_3$. According to the invention, every difference which can be formed from these three quantities is to be less than 0.1. In uniaxially oriented materials, $n_1 = n_2 \neq n_3$ and the birefringence Δn is defined as $|n_1 - n_3|$. The difference is understood to be a difference at a particular position inside a sample of the polymer. The refractive indices as well as their differences may vary from position to position.

It is furthermore understood that the birefringence generally is a wavelength-dependent material property. Typically, the birefringence may change by 0.02 across the visible spectrum. The wavelength-dependency is material-dependent.

The inventor has observed that the degree of scattering caused by thick films of oriented liquid-crystal materials (which need not be polymerized, let alone cross-linked) is related to the degree of optical anisotropy of the material and can be reduced by lowering the degree of optical anisotropy. Thus, it is possible to reduce the degree of scattering while keeping the optical retardation constant.

An oriented cross-linked polymer having a low degree of optical anisotropy is obtained by orienting a polymerizable liquid-crystal composition, comprising a (non-order-reducing) liquid-crystal monoacrylate represented by the formula 9 of the formula listed above and a cross-linking agent and subsequently polymerizing said composition. If said composition is uniaxially oriented, both before and after polymerisation, a low birefringence is obtained. During polymerization the birefringence changes negligibly. The birefringence of the monomer represented by formula represented by formula 9 is 0.025.

If the monomer 9 is provided with two polymerable groups, its mesogenic groups end up between the cross-links of the resulting oriented cross-linked polymer. As a result, the orientation of at least these mesogenic groups is permanently fixed and therefore the contribution to the birefringence of these mesogenic groups as well.

A disadvantage of the cross-linked polymer obtained from monomers represented by formula 9 is that its refractive indices are rather small: the ordinary refractive index of the monomer represented by formula 9 is 1.477 and the extraordinary refractive index is 1.517. An optical element such as a polarizing beam splitter often uses a glass substrate of which the refractive index has to be matched to the (extra) ordinary refractive index of the cross-linked polymer. In case polymers obtained from monomers represented by formula 9 are used, glass having a low refractive index is required, which is relatively expensive. If relatively large (extra)ordinary refractive indices are required, use is preferably made of cross-linked polymers which are obtained using the method according to the invention. Using the method according to the invention, which involves the use of order-reducing monomers, a birefringence as low as 0.009 can be obtained, while the ordinary refractive index is approximately 1.55 and the extraordinary refractive index is approximately 1.65.

The invention further relates to an optical element comprising an oriented cross-linked polymer according to the invention. Examples of optical elements which can be made using such cross-linked polymers are retardation plates, Wollaston prisms, (polarizing) beam splitters, reflective polarizers, band pass filters, notch filters and compensation foils.

The cross-linked polymers according to the invention can be used to obtain optical elements which combine the advantages associated with the use of cross-linked polymers and the use of materials having a low degree of optical anisotropy. Compared to a material having a high degree of optical anisotropy, the amount of scattering is significantly lower, even if the same degree of optical retardation is to be obtained. Since scattering is reduced, the optical element can be made in a size which allows convenient mass-production. For example, in the case of a film, the film thickness can be of the order of 1 mm or more.

In order to participate in the chemical reaction, the polymerizable group(s) of the monomers must be brought into a favorable position which requires movement of the polymerizable group(s) on a molecular level. The invention is based on the insight that, if the monomer is relatively stiff and/or short, not just the polymerizable group and (part of) the spacer has to move, but the entire monomer, thus causing a large disturbance of the order during polymerization.

These and other aspects of the invention will be apparent from and elucidated with reference to the embodiments described hereinafter.

BRIEF DESCRIPTION OF THE DRAWINGS

In the drawings:

FIG. 1 shows the transmission T (in %) as a function of the film thickness t (in mm) of a light beam perpendicularly incident on the film surface for three films of different uniaxially oriented liquid crystal materials having mutually different degrees of optical anisotropy, measured at an acceptance angle of 0.4°.

DESCRIPTION OF THE PREFERRED EMBODIMENTS

EMBODIMENT 1

An oriented cross-linked polymer according to the invention is prepared using a method according to the invention. It has the shape of a wedge which has a maximum thickness of 300 microns, thus yielding an optical element in the form of a polarizing beam splitter. The optical element is prepared as follows:

A polymerizable liquid-crystal composition is prepared by mixing 1 part by weight (0.5 g) of the liquid crystal monomer represented by the formula 2 listed above and 1 part by weight (0.5 g) of the order-reducing monomer represented by the formula 7. Since both the monomer represented by the formula 2 and monomer 7 have two polymerizable groups, they both fulfil the role of cross-linking agent as well. The monomer represented by 2 can be synthesized according to a method described in a publication by Broer et al. in Makromol. Chem., 1989, 190, 2255. The monomer represented by formula 7 is synthesized using a similar method. A quantity of 0.5 wt % of the photosensitive initiator 2,2-dimethoxy-2-phenyl-acetophenone (Ciba Geigy) is added to the composition.

Two rectangular glass plates (2×3 cm) are each provided with an orientation layer by spin-coating (4000 rpm) a polyimide (JSR, AL1051) which is subsequently dried and heated at 200° C. for 5 min. Both orientation layers are oriented in the same direction by rubbing with a velvet cloth. The glass plates are arranged so as to define a wedge-shaped interspace with an angle of a few degrees. The points of contact of the glass plates define a straight line. The direction of this line coincides with the rubbing direction of both glass plates.

The interspace is partially filled with the polymerizable liquid-crystal composition, resulting in a uniaxial orientation. The composition is polymerized at a temperature of 110° C. using UV radiation (Philips PL lamp No P110W10) having an intensity of 1 mW/cm$^2$ for 15 min, thereby forming the oriented cross-linked polymer. During polymerization, the order of the polymerizable liquid crystal composition is reduced: Before polymerization, the birefringence $\Delta n$ is 0.13, after polymerization the birefringence $\Delta n$ is 0.105, whereas the ordinary refractive index $n_o$ and the extraordinary refractive index $n_e$ of the cross-linked polymer, as measured by means of an Abbe refractometer set at 589 nm, are 1.547 and 1.652, respectively.

EMBODIMENTS 2–24

Embodiment 1 is repeated a number of times while varying the nature of the liquid-crystal monomer, the nature of the order-reducing monomer, the ratio of liquid-crystal monomer to order-reducing monomer and/or the temperature at which the polymerization is performed. The results relating to the embodiments 2–24 are summarized in Table 1.

TABLE 1

| $M_1$ | $M_2$ | $M_1$:$M_2$(w/w) | T (° C.) | $n_e$ | $n_o$ | $\Delta n$ |
|---|---|---|---|---|---|---|
| 2 | 7 | 1:1 | 90 | 1.539 | 1.664 | 0.125 |
| 2 | 7 | 1:3 | 110 | 1.577 | 1.619 | 0.042 |
| 2 | 7 | 1:3 | 90 | 1.566 | 1.640 | 0.074 |
| 3 | 7 | 1:1 | 100 | 1.552 | 1.641 | 0.089 |
| 3 | 7 | 1:1 | 90 | 1.550 | 1.654 | 0.104 |
| 3 | 7 | 1:1 | 85 | 1.550 | 1.655 | 0.105 |
| 4 | 7 | 1:1 | 100 | 1.544 | 1.628 | 0.084 |
| 4 | 7 | 1:1 | 90 | 1.542 | 1.637 | 0.094 |
| 4 | 7 | 1:1 | 85 | 1.542 | 1.640 | 0.098 |
| 4 | 6 | 1:3 | 100 | 1.615 | 1.624 | 0.009 |
| 4 | 6 | 1:3 | 90 | 1.611 | 1.635 | 0.024 |
| 4 | 6 | 1:1 | 100 | 1.590 | 1.634 | 0.044 |
| 4 | 6 | 1:1 | 90 | 1.572 | 1.651 | 0.079 |

TABLE 1-continued

| $M_1$ | $M_2$ | $M_1:M_2$(w/w) | T (° C.) | $n_e$ | $n_o$ | $\Delta n$ |
|---|---|---|---|---|---|---|
| 4 | 6 | 3:1 | 100 | 1.542 | 1.643 | 0.101 |
| 4 | 6 | 3:1 | 90 | 1.542 | 1.651 | 0.109 |
| 2 | 6 | 1:3 | 90 | 1.618 | 1.643 | 0.025 |
| 2 | 6 | 1:1 | 90 | 1.570 | 1.662 | 0.092 |
| 2 | 6 | 3:1 | 90 | 1.547 | 1.680 | 0.133 |
| 2 | 6 | 1:1 | 110 | 1.587 | 1.643 | 0.056 |
| 2 | 6 | 1:1 | 100 | 1.575 | 1.660 | 0.085 |
| 2 | 6 | 1:1 | 95 | 1.573 | 1.665 | 0.092 |
| 1 | 6 | 1:1 | 110 | 1.580 | 1.673 | 0.093 |
| 1 | 6 | 1:1 | 100 | 1.578 | 1.688 | 0.110 |

Column $M_1$ indicates the liquid-crystal monomer by its formula number listed above. Column $M_2$ indicates the order-reducing monomer by its formula number of the formula sheet. The ratio of liquid crystal monomer to order-reducing monomer in weight by weight is given in column $M_1:M_2$, and the temperature at which the polymerization is performed, is given in column T.

EMBODIMENT 25

Synthesis of the monomer satisfying the formula 9 listed above: 4-ethyl-4'-(5-acryloyloxypentyl)-4'-cyanotrans-trans-dicyclohexyl.

Step 1. Synthesis of 5-(tetrahydropyran-2-yloxy) bromopentane.

To a solution of 16.7 g of 5-bromopentanol (0.1 mole) and 2.5 g of pyridinium 4-toluenesulphonate (10 mmole) in 100 ml of dichloromethane was added dropwise 13.7 ml of 3,4-dihydropyran (0.15 mole). After the addition, the mixture was stirred overnight. The solution was then extracted with 50 ml of an aqueous 20% sodium chloride solution and 50 ml of a saturated aqueous sodium bicarbonate solution. After drying over magnesium sulphate, elution over a thin silica pad and evaporation of the dichloromethane and excess of 3,4-dihydropyran, 20.5 g of the product (82%) was obtained as a yellow oil.

Step 2. Synthesis of 4-ethyl-4'-(5-hydroxypentyl)-4'-cyanotrans-trans-dicyclohexyl.

To a solution of 4.4 g of 4-ethyl-4'-cyano-trans-trans-dicyclohexyl (20 mmole) in 20 ml of tetrahydrofuran in a nitrogen atmosphere was added, with a syringe, 10 ml of a 2 molar solution of lithium diisopropylamide (20 mmole). After 30 min., the solution was cooled to −78° C. in a dry ice acetone mixture and 5.5 g of 5-(tetrahydropyran-2-yloxy)bromopentane (22 mmole) was added. After 30 min., the dry ice acetone mixture was removed and the mixture was left at room temperature for one night. Then the tetrahydrofuran was evaporated, 30 ml of methanol and 2 ml of concentrated hydrochloric acid solution were added and the mixture was boiled for one hour. After cooling, 50 ml of water and 50 ml of dichloromethane were added. The dichloromethane solution obtained after separation was extracted with 50 ml of water, dried over magnesium sulphate and evaporated. The resulting white solid was crystallized twice from 50 ml of ligroin (bp=60–80° C.) to obtain the product as a white powder. Yield: 3.2 g (52%) mp=64° C.

Step 3. Synthesis of 4-ethyl-4'-(5-acryloyloxypentyl)-4'-cyanotrans-trans-dicyclohexyl.

To a solution of 3.2 g of 4-ethyl-4'-(5-hydroxypentyl)-4'-cyano-trans-trans-dicyclohexyl (10 mmole) and 1.7 ml of triethylamine (12 mmole) in 30 ml of tetrahydrofuran was added dropwise a solution of 1 ml of acryloylchloride (12 mmole) in 20 ml of tetrahydrofuran. After stirring for one night, the reaction mixture was filtered and evaporated. The pure product, the monomer of which satisfying the formula 9 listed above, was obtained after elution with dichloromethane over silica. Yield: 2.0 g (56%), mp=30° C.

EMBODIMENT 26

Embodiment 1 is repeated with the difference that the polymerizable liquid crystal composition comprises 1 part by weight of the liquid-crystal monomer satisfying the formula 2 listed above and 1 part by weight of the (non order-reducing) liquid-crystal monomer satisfying formula 9 listed above as synthesized in embodiment 25. The composition is uniaxially oriented and polymerized at 45° C. After polymerization, the extraordinary refractive index equals 1.517, the ordinary refractive index equals 1.586 and the birefringence equals 0.069. Before polymerization, the birefringence is approximately equal to said value.

EMBODIMENT 27

FIG. 1 shows the transmission T (in %) as a function of the film thickness t (in mm) of a light beam perpendicularly incident on the film surface for three films of different uniaxially oriented liquid crystal materials having mutually different degrees of optical anisotropy, measured at an acceptance angle of 0.4°.

A typical measurement is obtained as follows:

Two glass plates provided with orientation layers of the type used in embodiment 1, one glass plate being provided along its edges with spacers of a suitable thickness, are positioned opposite and parallel to each other and are glued together using a diacrylate glue. The cell thus produced is filled with a liquid crystal material while adopting a uniaxial orientation. Using a tilting compensator and a polarizing microscope the extraordinary and ordinary refractive index is measured.

The upper curve, labelled $\Delta n=0.076$, is obtained using the liquid-crystal material Zli 2857 (Merck), the composition of which is proprietary.

The middle curve, labelled $\Delta n=0.146$, is obtained using the liquid-crystal material E170 (supplier Merck) which is mixture of various 4'-alkyl-4-cyanobiphenyls and 4"-alkyl-4-cyanoterphenyls.

The lower curve, labelled $\Delta n=0.225$, is obtained using the liquid crystal material E7 (supplier BDH), which is another mixture of 4'-alkyl-4-cyanobiphenyls and 4"-alkyl-4-cyanoterphenyls.

FIG. 1 demonstrates that the degree of scattering increases as the film thickness increases. At zero thickness, one observes the reflection losses at the glass-substrate interfaces. Furthermore, FIG. 1 demonstrates that the degree of scattering is less if the degree of optical anisotropy, expressed in terms of the birefringence, is lowered. Also, FIG. 1 demonstrates that, at a constant optical retardation $t\Delta n$, the degree of scattering can be reduced by lowering the degree of optical anisotropy.

We claim:

1. A method of preparing an oriented cross-linked optically anisotropic polymer, wherein a polymerizable liquid-crystal composition comprising at least a liquid-crystal monomer, is oriented and subsequently polymerized, wherein the polymerizable liquid-crystal composition further comprises means for adjusting the degree of optical anisotropy of said polymer to desired values in the form of an order-reducing monomer which reduces the order of said liquid-crystal composition during polymerization.

2. A method as claimed in claim 1, wherein the order-reducing monomer satisfies the formula Y—$L^3$—M—$L^4$—

Y, where Y is a polymerizable group selected from the group consisting of acryloxy, methacryloxy, vinyloxy and epoxy, —$L^3$— and —$L^4$— are linker units which are independently selected and represent a direct bond or —$CH_2$—, —M— is a mesogenic unit selected from the group consisting of —$M^1$—$M^2$—, —$M^1$—$M^3$—$M^2$—, —$M^1$—COO—$M^2$—, —$M^1$—COO—$M^3$—OCO—$M^2$—, —$M^1$—COO—$M^3$—COO—$M^2$— and —$M^1$—OCO—$M^3$—COO—$M^2$—, —$M^1$— and —$M^2$— are independently selected and represent a 1,4-phenylene or a 1,4-cyclohexylene, —$M^3$— represents

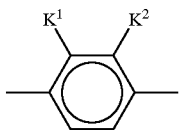

3 and —$K^1$ and —$K^2$ are independently selected from the group consisting of —H, —$CH_3$, —CN and —Cl.

3. A method as claimed in claim 1, wherein the order-reducing monomer satisfies the formula Y—$L^3$—M—P, where Y is a polymerizable group selected from the group consisting of acryloxy, methacryloxy, vinyloxy and epoxy, —$L^3$— is a linker unit which is independently selected and represents a direct bond or —$CH_2$—, —M— is a mesogenic unit selected from the group consisting of —$M^1$—$M^2$—, —$M^1$—$M^3$—$M^2$—, —$M^1$—COO—$M^2$—, —$M^1$—COO—$M^3$—OCO—$M^2$—, —$M^1$—COO—$M^3$—COO—$M^2$— and —$M^1$—OCO—$M^3$—COO—$M^2$—, —$M^1$— and —$M^2$— are independently selected and represent a 1,4-phenylene or a 1,4-cyclohexylene, —$M^3$— represents

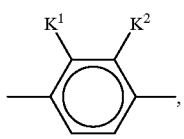

4 wherein —$K^1$ and —$K^2$ are independently selected from the group consisting of —H, —$CH_3$, —CN and —Cl and P is selected from the group consisting of cyano, alkyl and alkoxy.

4. A method as claimed is claim 1, wherein the order-reducing monomer is a compound having a formula selected from the group consisting of

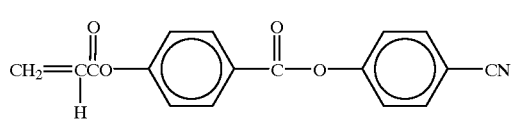

(5)

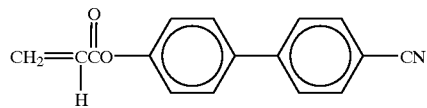

(6)

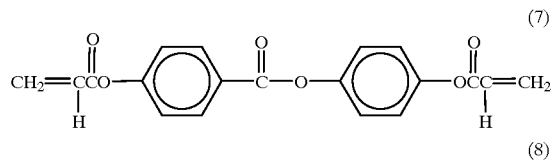

(7)

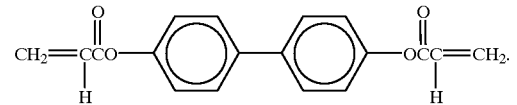

(8)

5. A polymerizable liquid-crystal composition, comprising at least a liquid crystal monomer, wherein the polymerizable liquid-crystal composition further comprises means for adjusting the degree of optical anisotropy of said polymer to desired values in the form of an order-reducing monomer which reduces the order of said liquid-crystal composition during polymerization.

6. An oriented cross-linked polymer obtained by polymerizing a polymerizable liquid crystal composition, using a method as claimed in claim 1 and wherein the difference between the highest and lowest refractive index of the oriented cross-linked polymer is less than 0.10.

7. An optical element comprising an oriented cross-linked polymer as claimed in claim 6.

8. A method of preparing an oriented cross-linked optically anisotropic polymer, wherein a polymerizable liquid-crystal composition comprising at least a liquid-crystal polymerizable material, is oriented and subsequently polymerized, wherein the polymerizable liquid-crystal composition further comprises an order-reducing monomer which reduces the order of said liquid-crystal composition during polymerization, said liquid-crystal polymerizable material and said monomer being present in a ratio of from about 3:1 to about 1:3.

9. A method as claimed in claim 8, wherein the order-reducing monomer satisfies the formula Y—$L^3$—M—$L^4$—Y, where Y is a polymerizable group selected from the group consisting of acryloxy, methacryloxy, vinyloxy and epoxy, —$L^3$— and —$L^4$— are linker units which are independently selected and represent a direct bond or —$CH_2$—, —M— is a mesogenic unit selected from the group consisting of —$M^1$—$M^2$—, —$M^1$—$M^3$—$M^2$—, —$M^1$—COO—$M^2$—, —$M^1$—COO—$M^3$—OCO—$M^2$—, —$M^1$—COO—$M^3$—COO—$M^2$— and —$M^1$—OCO—$M^3$—COO—$M^2$—, —$M^1$— and —$M^2$— are independently selected and represent a 1,4-phenylene or a 1,4-cyclohexylene, —$M^3$— represents

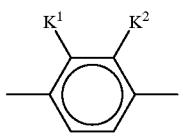

5 and —$K^1$ and —$K^2$ are independently selected from the group consisting of —H, —$CH_3$, —CN and —Cl.

10. A method as claimed in claim 8, wherein the order-reducing monomer satisfies the formula Y—L$^3$—M—P, where Y is a polymerizable group selected from the group consisting of acryloxy, methacryloxy, vinyloxy and epoxy, —L$^3$— is a linker unit which is independently selected and represents a direct bond or —CH$_2$—, —M— is a mesogenic unit selected from the group consisting of —M$^1$—M$^2$—, —M$^1$—M$^3$—M$^2$—, —M$^1$—COO—M$^2$—, —M$^1$—COO—M$^3$—OCO—M$^2$—, —M$^1$—COO—M$^3$—COO—M$^2$— and —M$^1$—OCO—M$^3$—COO—M$^2$—, —M$^1$— and —M$^2$— are independently selected and represent a 1,4-phenylene or a 1,4-cyclohexylene, —M$^3$— represents

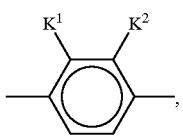
(6)

wherein —K$^1$ and —K$^2$ are independently selected from the group consisting of —H, —CH$_3$, —CN and —Cl and P is selected from the group consisting of cyano, alkyl and alkoxy.

11. A method a claimed in claim 8, wherein the order-reducing monomer is a compound having a formula selected from the group consisting of

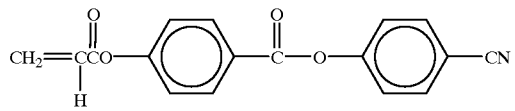
(5)

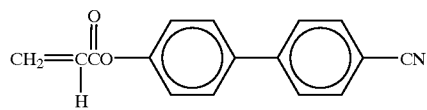
(6)

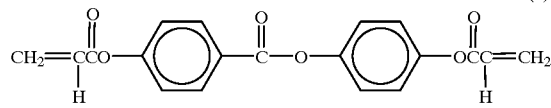
(7)

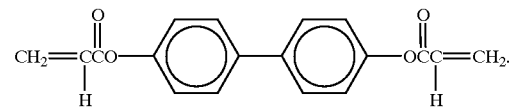
(8)

12. A polymerizable liquid-crystal composition, comprising at least a polymerizable liquid crystal material, wherein the polymerizable liquid-crystal composition further comprises an order-reducing monomer, which reduces the order of said liquid-crystal composition during polymerization, said liquid-crystal polymerizable material and said monomer being present in a ratio of from about 3:1 to about 1:3.

13. An oriented cross-linked polymer obtained by polymerizing a polymerizable liquid crystal composition, using a method as claimed in claim 8 and wherein the difference between the highest and lowest refractive index of the oriented cross-linked polymer is less than 0.10.

14. An optical element comprising an oriented cross-linked polymer as claimed in claim 13.

* * * * *